United States Patent
Aranjani et al.

(10) Patent No.: US 9,645,636 B2
(45) Date of Patent: May 9, 2017

(54) CENTRALIZED POWER MANAGEMENT WITH PARTIAL SUSPEND MODE FOR DISTRIBUTED STORAGE SYSTEMS

(71) Applicant: VMWARE, INC., Palo Alto, CA (US)

(72) Inventors: Noble Peter Aranjani, Bangalore (IN); Jubish Jose Kulathumkal, Bangalore (IN); Sivaprasad Govindankutty K, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 11 days.

(21) Appl. No.: 14/806,679

(22) Filed: Jul. 23, 2015

(65) Prior Publication Data

US 2016/0328007 A1    Nov. 10, 2016

(30) Foreign Application Priority Data

May 6, 2015    (IN) .......................... 2308/CHE/2015

(51) Int. Cl.
| | | |
|---|---|---|
| *G06F 1/00* | (2006.01) | |
| *G06F 1/32* | (2006.01) | |
| *G06F 3/06* | (2006.01) | |
| *G06F 11/14* | (2006.01) | |

(52) U.S. Cl.
CPC .......... *G06F 1/3287* (2013.01); *G06F 1/3275* (2013.01); *G06F 3/067* (2013.01); *G06F 3/0625* (2013.01); *G06F 3/0634* (2013.01); *G06F 3/0665* (2013.01); *G06F 3/065* (2013.01); *G06F 3/0658* (2013.01); *G06F 3/0688* (2013.01); *G06F 3/0689* (2013.01); *G06F 11/1464* (2013.01); *G06F 11/1469* (2013.01)

(58) Field of Classification Search
CPC ...... G06F 3/0689; G06F 3/065; G06F 3/0688; G06F 11/1469; G06F 11/1464; G06F 3/0658
USPC ......................................... 713/300, 320, 323
See application file for complete search history.

(56) References Cited

U.S. PATENT DOCUMENTS

| | | |
|---|---|---|
| 5,450,589 A | 9/1995 | Maebayashi et al. |
| 5,930,823 A | 7/1999 | Ito et al. |
| 6,587,950 B1 | 7/2003 | Shah et al. |
| 7,032,128 B2 | 4/2006 | Nakano |
| 7,111,158 B1 | 9/2006 | Burroughs et al. |
| 8,145,932 B2 | 3/2012 | Dawkins et al. |
| 8,412,892 B2 | 4/2013 | Watanabe et al. |
| 2007/0097130 A1* | 5/2007 | Margulis ............... G06F 3/1431 345/501 |

(Continued)

*Primary Examiner* — Michael J Brown

(57) ABSTRACT

An example method is provided to perform centralized power management for a distributed storage system accessible by a cluster in a virtualized computing environment. The method may comprise a management entity identifying a first host from the cluster to enter into a partial suspend mode, and selecting a second host from the cluster to take control of a storage controller of the first host. The method may further comprise the management entity transferring control of the storage controller to the second host to allow the second host to control the storage controller via a network controller of the first host; and instructing the first host to enter into the partial suspend mode to suspend operations of one or more components of the first host while the storage controller is controllable by the second host via the network controller.

30 Claims, 11 Drawing Sheets

(56) References Cited

U.S. PATENT DOCUMENTS

| | | |
|---|---|---|
| 2009/0292934 A1* | 11/2009 | Esliger ................ G06F 1/3203 713/323 |
| 2010/0332884 A1 | 12/2010 | Yoshida et al. |
| 2011/0283116 A1 | 11/2011 | Ban |
| 2012/0036387 A1 | 2/2012 | Nakashima et al. |
| 2013/0246857 A1 | 9/2013 | Minamiura |
| 2014/0122816 A1 | 5/2014 | Barnes et al. |
| 2016/0224263 A1 | 8/2016 | Colpo et al. |
| 2016/0328006 A1 | 11/2016 | Aranjani et al. |

* cited by examiner

CENTRALIZED POWER MANAGEMENT WITH PARTIAL SUSPEND MODE FOR DISTRIBUTED STORAGE SYSTEMS

CROSS-REFERENCE TO RELATED APPLICATION

Benefit is claimed under 35 U.S.C. 119(a)-(d) to Foreign application Serial No. 2308/CHE/2015 filed in India entitled "CENTRALIZED POWER MANAGEMENT WITH PARTIAL SUSPEND MODE FOR DISTRIBUTED STORAGE SYSTEMS", on May 6, 2015, by VMware, Inc, which is herein incorporated in its entirety by reference for all purposes.

The present application is related in subject matter to U.S. patent application Ser. No. 14/806,674, which is incorporated herein by reference.

BACKGROUND

Unless otherwise indicated herein, the approaches described in this section are not admitted to be prior art by inclusion in this section.

Virtualization allows the abstraction of hardware resources and the pooling of these resources to support multiple virtual machines in a virtualized computing environment. For example, through virtualization, virtual machines running different operating systems may be supported by the same physical machine (e.g., referred to as a "host"). Each virtual machine is generally provisioned with virtual resources that provide similar functions as the physical hardware of the host, such as central processing unit (CPU) resources, memory resources, storage resources and network resources to run an operating system and applications.

Storage resources are required by a virtual machine to store data relating to the operating system and applications run by the virtual machine, etc. In a distributed storage system, storage resources of a cluster of hosts may be aggregated to form a single shared pool of storage. Virtual machines supported by the hosts within the cluster may then access the pool of storage to store data. However, for the distributed storage system to operate, all hosts within the cluster are generally required to be powered on at all times.

DETAILED DESCRIPTION

Figure 1:
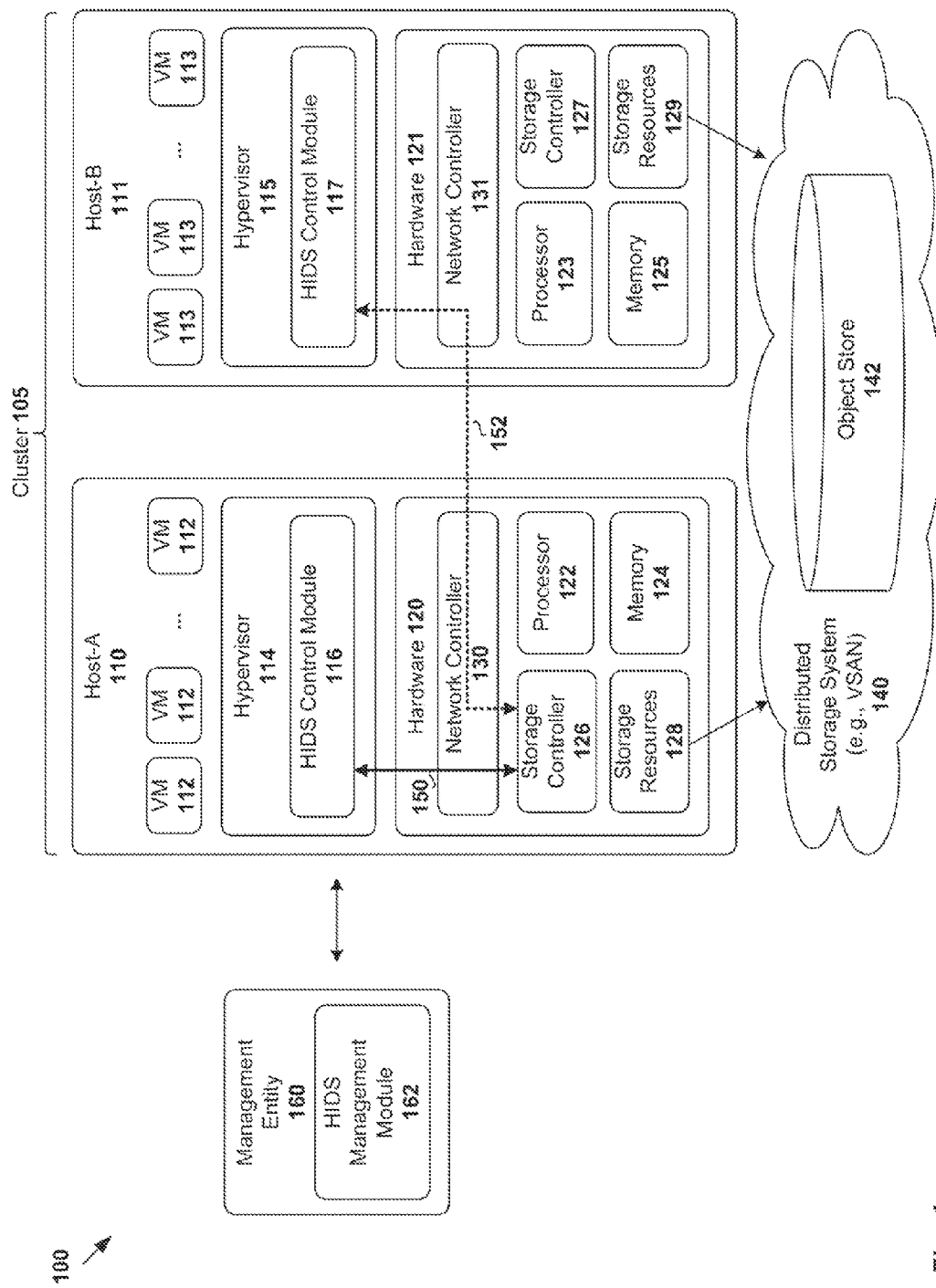
FIG. 1, which is a schematic diagram illustrating an example virtualized computing environment that includes a distributed storage system accessible by a cluster.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of operating a distributed storage system will now be further explained using FIG. 1, which is a schematic diagram illustrating example virtualized computing environment 100 that includes distributed storage system 140 accessible by cluster 105. Although an example is shown, it should be understood that virtualized computing environment 100 may include additional or alternative components, and each component may have a different configuration.

In the example in FIG. 1, virtualized computing environment 100 includes cluster 105 of hosts (also known as "host computers", "physical servers", "server systems", "host computing systems", etc.) such as Host-A 110 and Host-B 111. Each host 110/111 includes suitable hardware 120/121 to support multiple virtual machines 112/113. Each host 110/111 also executes virtualization software (e.g., hypervisor 114/115) to maintain a mapping between hardware 120/12 and virtual resources assigned to virtual machines 112/113.

For example, Host-A 110 executes hypervisor 114 and includes hardware components 120 such as processor 122 (e.g., CPU), memory 124 (e.g., random access memory), storage controller 126, storage resources 128 (e.g., storage disks) accessible via storage controller 126, network controller 130 to provide network connection, etc. Similarly, to support virtual machines 113, Host-B 111 executes hypervisor 115 and includes hardware components 121 such as processor 123, memory 125, storage controller 127, storage resources 129, network controller 131, etc. Hypervisor 114/115 may also be a "type 2" or hosted hypervisor that runs on top of a conventional operating system on host 110/111. Although two hosts are shown for simplicity, cluster 105 may include any number of hosts (e.g., up to 64).

Cluster 105 may aggregate local storage resources 128/129 of each host 110/111 to form distributed storage system 140 that represents a shared pool of storage. Distributed storage system 140 may employ any suitable technology, such as Virtual Storage Area Network (VSAN) from Vmware, Inc., SvSAN from StorMagic Limited, etc. For example, Host-A 110 and Host-B 111 may aggregate their respective storage resources 128 and 129 into object store 142 for storing virtual disks and other data relating to virtual machines 112/113. This may include virtual machine home objects, swap objects, virtual disk, snapshots, memory, etc.

Object store 142 (also known as a datastore) is a logical volume of the aggregated storage resources 128/129. Any suitable disk format may be used, such as virtual machine file system leaf level (VMFS-L), Virtual SAN on-disk file system, etc. In practice, storage resources 128/129 may be any suitable physical storage devices that are housed in or directly attached to host 110/111, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, Integrated Drive Electronics (IDE) disks, Universal Serial Bus (USB) storage, etc.

Conventionally, all hosts (e.g., Host-A 110 and Host-B 111) within cluster 105 are required to be up and running all the times to maintain access to data stored on distributed storage system 140. For example in virtualized computing environment 100, a feature called Distributed Power Management (DPM) is generally used to power off host 110/111 in periods of low resource utilization and power on host 110/111 when resources are required. However, DPM cannot be used on an existing VSAN-enabled cluster 105.

In the example in FIG. 1, even when Host-A 110 becomes idle for a period of time, it cannot be powered off. Otherwise, any data stored on storage resources 128 of Host-A 110 will no longer be accessible. Keeping all hosts within cluster 105 running even when resource utilization is low makes distributed storage system 140 inefficient and expensive to run. This problem is exacerbated as the size of cluster 105 increases and may become a major bottleneck in virtualized computing environment 100.

Power Management

According to examples of the present disclosure, power management may be implemented to reduce power consumption in virtualized computing environment 100. In particular, instead of keeping Host-A 110 fully powered on all the time, Host-A 110 may be entered into a "partial suspend mode" to save power, such as when resource utilization is low or host maintenance is required, etc. To maintain access to storage resources 128 of Host-A 110, control of storage controller 126 of Host-A 110 may be transferred to another host such as Host-B 111. As such, even when Host-A 110 is not fully powered on and its hypervisor 114 not running, local storage controller 126 may continue operating to provide access to storage resources 128.

Throughout the present disclosure, the term "partial suspend mode" may refer generally to a mode in which operations of one or more components of one host (e.g., Host-A 110) are suspended while its storage controller (e.g., 126) is controllable by another host (e.g., Host-B 111). Distributed storage system 140 may be referred to as a "Host Independent Distributed Storage" (HIDS) system where local storage of a host (e.g., Host-A 110) may be controlled by any other host (e.g., Host-B 111), As will be described further using FIG. 3 and FIG. 4, each host 110/111 may execute HIDS control module 116/117 to perform power management. For example, hypervisor 114/115 or an operating system running on hypervisor 114/115 may execute HIDS control module 116/11. Further, management entity 160 may execute a corresponding HIDS management module 162.

In the example in FIG. 1, storage controller 126 may be controlled by HIDS control module 116 of Host-A 110 when fully powered on. Full line 150 between HIDS control module 116 and storage controller 126 in FIG. 1 represents an active control line, which means Host-A 110 has active control of its local storage controller 126 via network controller 130. Dotted line 152 between HIDS control module 117 and storage controller 126 in FIG. 1 represents a passive control line, which means Host-B 111 currently does not have active control of storage controller 126 but may take over. When Host-A 110 enters into the partial suspend mode, control of storage controller 126 is transferred from HIDS control module 116 of Host-A 110 to HIDS control module 117 of Host-B 111. In this case, full line 150 switches from active to passive, while dotted line 152 switches from passive to active.

Host in Partial Suspend Mode

Figure 2:
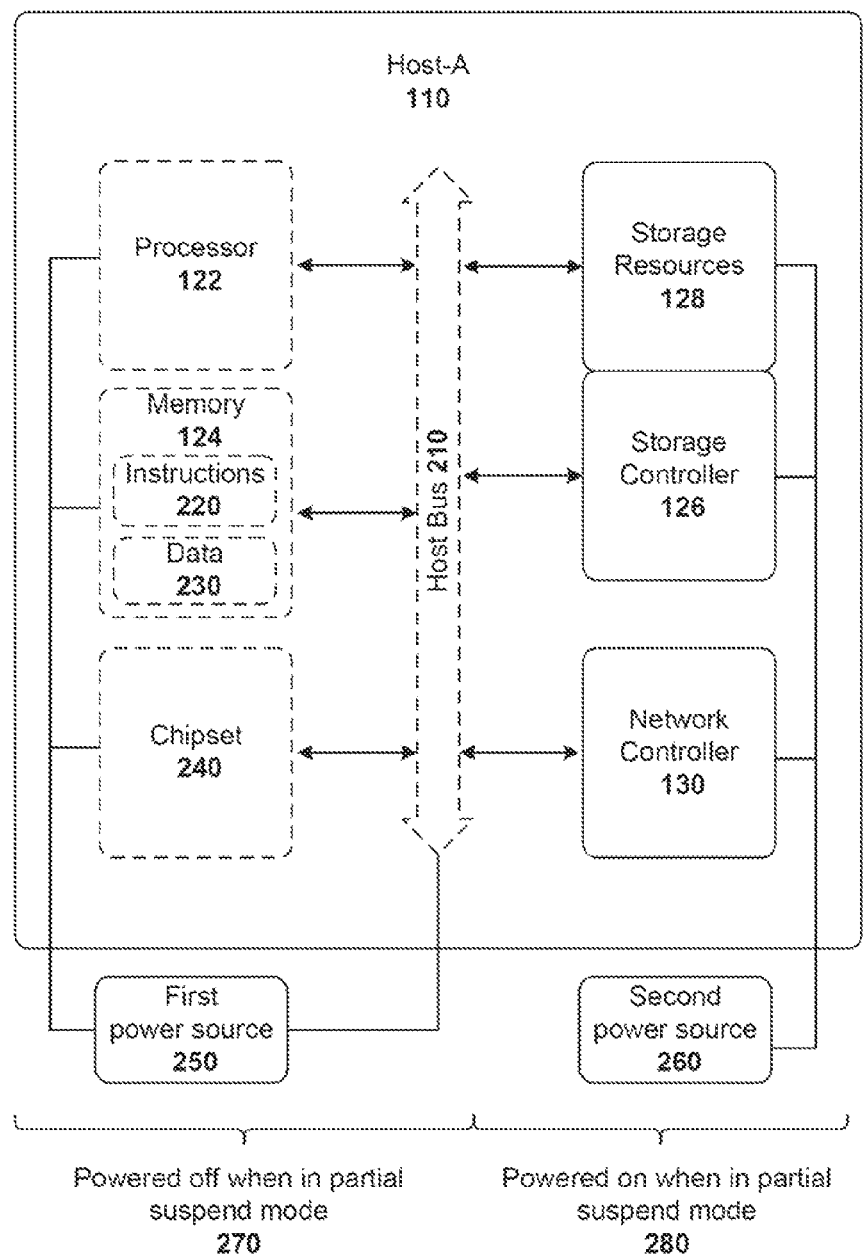
FIG. 2 is a schematic diagram illustrating an example host computing system when in a partial suspend mode.

When in the partial suspend mode, operations of one or more hardware components are suspended to save power. The term "suspend" may refer generally to temporarily pausing or halting the operations to reduce power consumption of the one or more hardware components. In more detail, FIG. 2 is a schematic diagram illustrating example host computing system 200 (e.g., capable of acting as Host-A 110) when in a partial suspend mode. Although an example is shown, it should be understood that the host may include additional or alternative components, and each component may have a different configuration.

In the example in FIG. 2, Host-A 110 includes processor 122, memory 124, storage controller 126, storage resources 128 and network controller 130 that are in communication via host bus 210. Memory 124 (also known as "computer-readable storage medium") may store suitable instructions 220 for execution by processor 122 and data 230 to implement hypervisor 114 and HIDS control module 116, etc. Host-A 110 also include any other components, such as chipset 240. Here, chipset 240 may include any suitable electronic circuits controlling Input/Output (I/O) operations such as video, audio, communication ports, memory 124, etc. First power source 250 is used to supply power to processor 122, memory 124 and chipset 240, and second power source 260 to host bus 210, storage controller 26, storage resources 128 and network controller 130.

When in partial suspend mode, power supply from first power source 250 to processor 122, memory 124, and chipset 240 is reduced or cut off (see 270). However, second power source 260 still supplies power to host bus 210, storage controller 126, storage resources 128 and network controller 130 (see 280). This is to allow Host-B 111 to control storage controller 126 via network controller 130 in order to access storage resources 128. Although two power sources are shown in FIG. 2, there may be additional power source, or power sources 250 and 260 combined into a single source.

In one implementation, storage controller 126 may be configured to receive and send any control and data communication via network controller 130, rather than directly through host bus 210. This configuration allows storage controller 126 to be controlled any host within cluster 105 via network controller 130, including Host-A 110 using HIDS control module 116, or Host-B 111 using HIDS control module 117. Since this configuration may bypass processor 122, memory 124 and chipset 240, overhead at these components may be reduced. As such, power consumption may be reduced not only when Host-A 110 is in partial suspend mode, but also when Host-A 110 is fully powered on.

For Host-B 111 to communicate with storage controller 126, a communication path may be established between HIDS control module 117 and storage controller 126 via network controller 131 and network controller 130 (see line 152 in FIG. 1 again). The communication path may be a local area network (LAN) channel, such as Ethernet channel, etc. Host-A 110 and Host-B 111 may control storage controller 126 via network controller 130 using respective unique controller identifiers (IDs), such as "Storage Controller A" and "Network Controller A" (e.g., Internet Protocol (IP) address), etc. The IDs may be advertised within cluster 105 during a configuration process, such as when cluster 105 is created or as host is added. Any suitable communication protocol may be used.

In practice, the partial suspend mode may be implemented based on Advanced Configuration Power Interface (ACPI) specification. ACPI defines a set of power states with different levels of power consumption for host 110/111. For example, the power states may include a combination of global "Gx" states and sleep "Sx" states, such as "G0(S0), Working", "G1(S1), Sleeping—Power on Suspend", "G1 (S2), Sleeping—CPU powered off", "G1(S3), Sleeping—Standby", "G1(S4), Sleeping—Hibernation", "G2(S5)—Soft Off", "G3—Mechanical Off", etc. In the example in FIG. 2, Host-A 110 may be placed in power state G1(S1) or G1(S3) while host bus 210, storage controller 126, storage resources 128 and network controller 130 remain in G0(S0). Any alternative or additional states may be used.

The power states defined by ACPI may be leveraged to power on selected components of Host-A 110 while powering off the rest as discussed above. In a local area network (LAN) such as Ethernet, a feature called Wake-on-LAN leverages ACPI to make network controller 130 alive although some components of Host-A 110 are powered off. In practice, various device "Dx" states, processor "Cx" states, and performance "Px" states, etc., may be used.

Distributed and Centralized Approaches

Power management according to examples of the present disclosure may be implemented using a distributed approach and a centralized approach. An overview of each approach is provided below using FIG. 3 and FIG. 4. Overall, in the example distributed approach in FIG. 3, Host-A 110 (e.g., HIDS control module 116) determines whether to enter into the partial suspend mode and transfer control of its storage controller 126 to Host-B 111.

Figure 3:
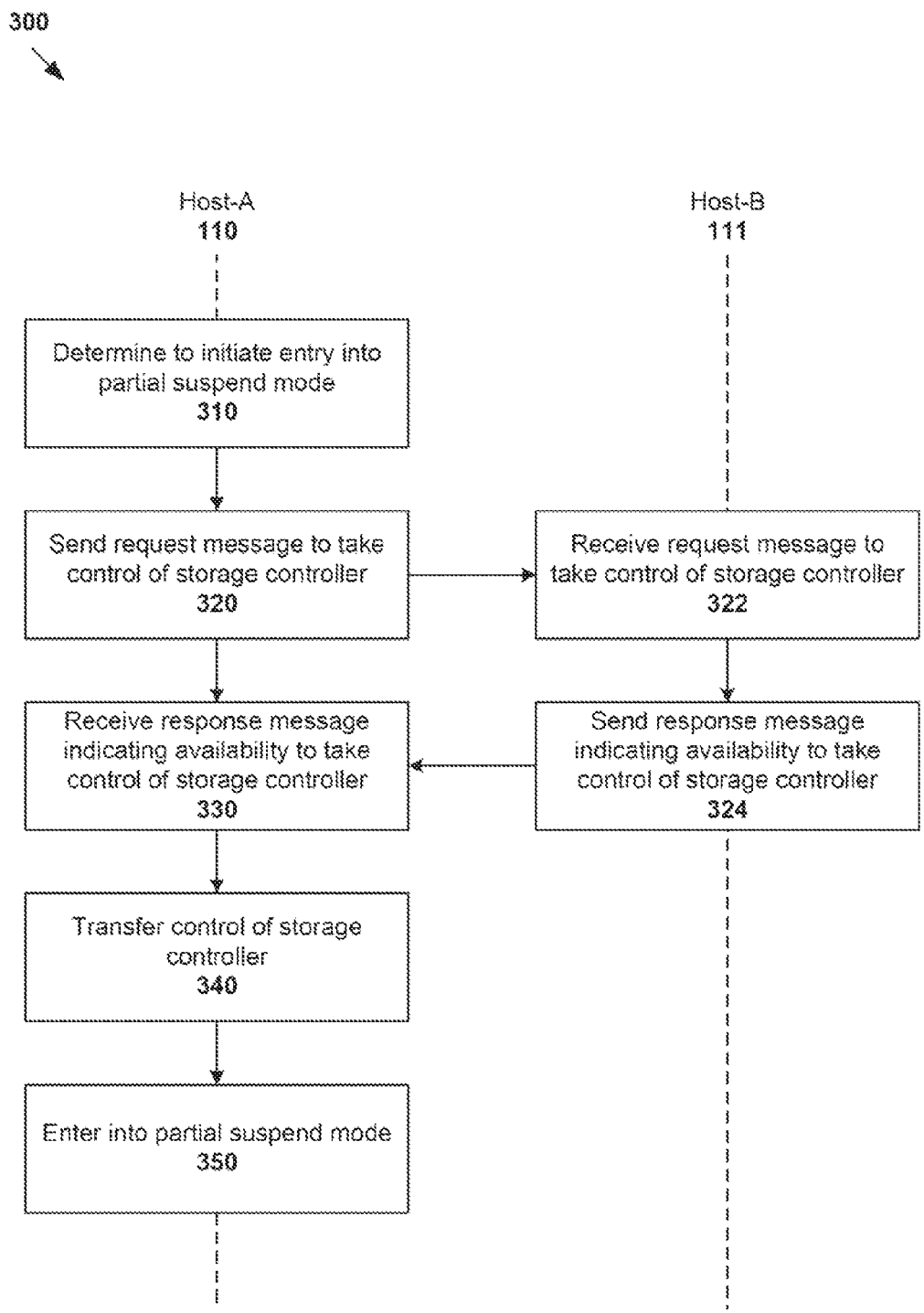
FIG. 3 is a flowchart of an example process to perform power management for a distributed storage system according to a distributed approach.
Figure 4:
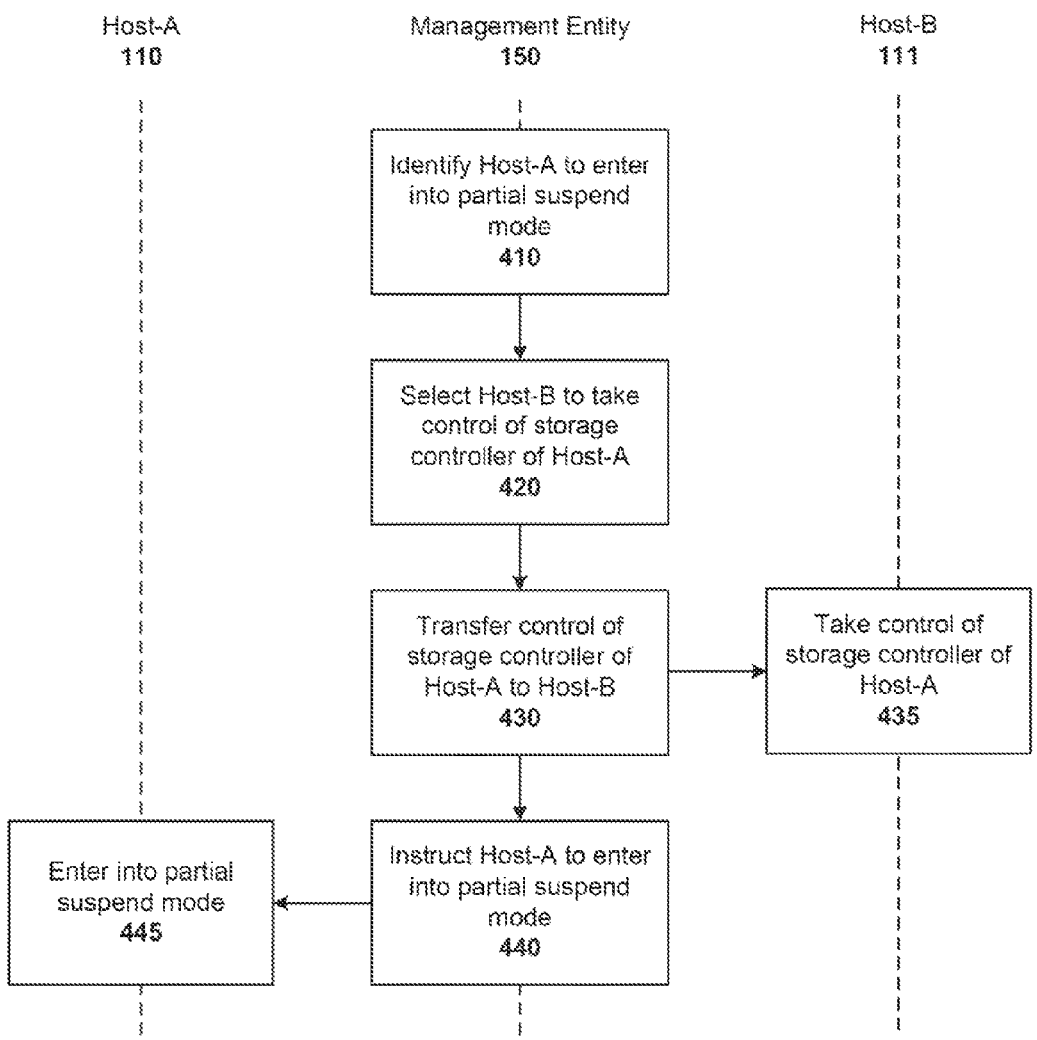
FIG. 4 is a flowchart of an example process to perform power management for a distributed storage system according to a centralized approach.

In the example centralized approach in FIG. 4, management entity 160 that operates independently of Host-A 110 and Host-B 111 determines whether to enter Host-A 110 into the partial suspend mode. In the example in FIG. 1, management entity 160 supports HIDS management module 162 to perform power management. In practice, management entity 160 may be implemented by one or more virtual or physical entities. For example, management entity 160 and HIDS management control module 162 may reside inside a "virtual appliance" (see also FIG. 7), In more detail, FIG. 3 is a flowchart of example process 300 to perform power management for distributed storage system 140 according to a distributed approach. Example process 300 may include one or more operations, functions, or actions illustrated by one or more blocks, such as blocks 310 to 350. The various blocks may be combined into fewer blocks, divided into additional blocks, and/or eliminated based upon the desired implementation.

In one example, blocks 310, 320, 330, 340 and 350 may be performed by HIDS control module 116 built into hypervisor 114 Host-A 110 (also referred to as "first host"), and blocks 322 and 324 by HIDS control module 117 built into hypervisor 115 of Host-B 111 (also referred to as "second host"). As explained using FIG. 3, operations of one or more components of Host-A 110 are suspended during the partial suspend mode, while storage controller 126 remains controllable by Host-B 111 via network controller 130.

At block 310 in FIG. 3, Host-A 110 determines to initiate entry into a partial suspend mode, such as when resource utilization is low or maintenance is required, etc. Next, at block 320, Host-A 110 sends a request message to Host-B 111 to take control of storage controller 126 of Host-A 110. At blocks 322 and 324, Host-B 111 receives the request message and sends a response message indicating its availability to take control of storage controller 126 of Host-A 110. At blocks 330, 340 and 350, after receiving the response message, Host-A 110 transfers control of storage controller 126 to Host-B 111 and enters into the partial suspend mode.

Compared to the centralized approach, the distributed approach does not require a separate management entity 160 to support a virtual appliance to implement HIDS management module 162. As such, the distributed approach is generally easier to configure and represents a simpler way of building the power management solution. This may be suitable for small to medium enterprises (SMEs).

FIG. 4 is a flowchart of example process 400 to perform power management for distributed storage system 140 according to a centralized approach. Example process 400 may include one or more operations, functions, or actions illustrated by one or more blocks, such as blocks 410 to 445. The various blocks may be combined into fewer blocks, divided into additional blocks, and/or eliminated based upon the desired implementation.

In one example, blocks 410, 420, 430 and 440 may be implemented by HIDS management module 162 supported by management entity 160, block 435 by HIDS control module 117 of Host-B 111, and block 445 by HIDS control module 116 of Host-A 110. Since most decision making is performed by management entity 160, Host-A 110 and Host-B 111 may implement a lightweight version of HIDS control module 116 and HIDS control module 117, respectively. This also allows Host-A 110 and Host-B 111 to communicate over a network (e.g., Ethernet) to share the state of each host or cluster 105.

At block 410 in FIG. 4, management entity 160 may identify Host-A 110 to enter into a partial suspend mode, such as when resource utilization is low, maintenance is required, etc. At block 420, management entity 160 may select Host-B 111 from cluster 105 to take control of storage controller 126 of Host-A 110 At block 430, management entity 160 may transfer control of storage controller 126 of Host-A 110 to allow Host-B 111 to control storage controller 126 via network controller 130. At block 440, management entity 160 may instruct Host-A 110 to enter into the partial suspend mode to suspend operations of one or more components of Host-A 110 while storage controller 126 is controllable by Host-B 111 via network controller 130. See also blocks 435 and 445.

Compared to the distributed approach, the centralized approach facilitates large-scale power management within cluster 105 and improves enterprise readiness in managing the solution. Since most decision making is made by management entity 160, it should be easier to enforce cluster-wide policies relating to when hosts should enter into the partial suspend mode. This in turn reduces processing burden on the hosts (e.g., on processor 122/123 and processor of storage controller 126/127), thereby further reducing power consumption. The centralized approach is also generally more robust and facilitates easier or more efficient deployment, configuration, maintenance and management of cluster 105 compared to the distributed approach.

In both approaches, the amount of power savings provided by the partial suspend mode may vary. For example, in a 20-host cluster that supports 2000 desktops during weekdays, five hosts may be only required to support 500 desktops during weekends due to reduced load. In this case, 15 hosts may enter into the partial suspend mode to reduce power consumption on 52 weeks×2 days=104 days of the year. If each host uses an average of 1.5 kilo watts when in the partial suspend mode compared to 7.5 kilo watts when fully powered on, there will be an average reduction of 6.0 kilo watts×24 hours×2 days×52 weeks×15 hosts=224,640 units of power per year.

HIDS according to examples of the present disclosure is suitable for implementation on a Software-Defined Data Center (SDDC) platform to further leverage the benefits of distributed storage system 140. By reducing power consumption, capital expenditure (CAPEX) and operational expenditure (OPEX) of virtualized computing, environment 100 may also be reduced. Further, examples in the present disclosure may reduce the complexity of power management, such as by eliminating or reducing the need of high-end shared storage architecture (e.g., network centralized storage array connected via Fibre Channel or Ethernet) that is conventionally used to reduce power consumption.

Further, examples of the present disclosure may reduce the need for data replication. Conventionally, data replication is implemented by storing multiple copies of the same data on storage resources 128/129 of different hosts. This is to provide fault tolerance in case there is a host failure where the host is powered off. According to examples of the present disclosure, however, local storage controller 126 and storage resources 128 may be accessible regardless of a host failure at Host-A 110, provided control of storage controller 126 is transferred to another host, Reducing the need for data replication saves storage space and costs.

Distributed Approach—Detailed Implementation

Detailed implementation of the example distributed approach in FIG. 3 will be discussed using FIG. 5 and FIG. 6. In particular, entry of a host (e.g., Host-A 110) into a partial suspend mode will be explained using FIG. 5, and its resumption from the partial suspend mode using FIG. 6.

(a) Entry Into Partial Suspend Mode

Figure 5:
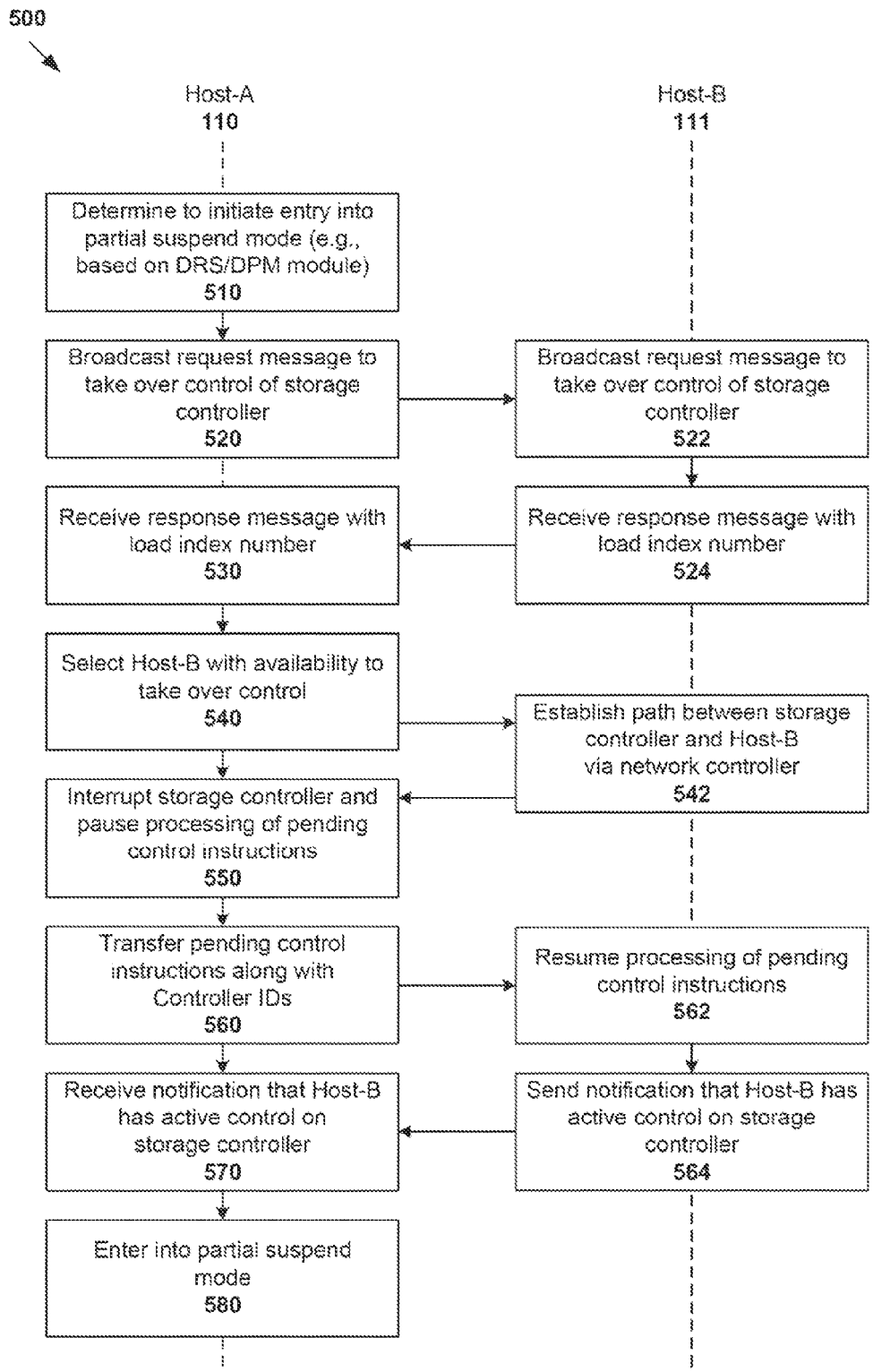
FIG. 5 is a flowchart of a detailed example process to perform power management when a host enters into a partial suspend mode according to the distributed approach in FIG. 3.

FIG. 5 is a flowchart of detailed example process 500 to perform power management when a host (e.g., Host-A 110) enters into a partial suspend mode according to the distributed approach in FIG. 3. Example process 500 may include one or more operations, functions, or actions illustrated by one or more blocks, such as blocks 510 to 580. The various blocks may be combined into fewer blocks, divided into additional blocks, and/or eliminated based upon the desired implementation.

At block 510 in FIG. 5 (related to block 310 in FIG. 3), HIDS control module 116 of Host-A 110 determines to initiate entry of Host-A 110 into a partial suspend mode. Block 510 may be based on data obtained (e.g., received or retrieved) from a distributed resource scheduler (DRS) module or distributed power management (DPM) module, such as data relating to the resource utilization or maintenance requirement of Host-A 110.

In general, the DRS module is a resource management tool for improving resource utilization within cluster 105 (e.g., through resource allocation, load balancing, etc.). The DPM module (a feature of DRS) is used for power management within cluster 105. In practice, the DRS module and DPM module may be implemented by management entity 160 or any other suitable entity.

For example, Host-A 110 may learn the number of virtual machines 112 running based on data obtained from the DRS/DPM module. If Host-A 110 runs two virtual machines 112 and Host-B 111 runs ten virtual machines 113, Host-A 110 may enter into the partial suspend mode after migrating the two virtual machines 112 onto Host-B 111. In practice, hypervisor 114 may identify Host-A 110 as a candidate for partial suspension before notifying HIDS control module 116.

At block 520 in FIG. 5 (related to block 320 in FIG. 3), HIDS control module 116 of Host-A 110 broadcasts a request message within cluster 105 to request for a takeover of the control of storage controller 126. The request message may be broadcasted over a control channel on a LAN connecting Host-A 110 and Host-B 111.

At blocks 522 and 524 in FIG. 5 (related to blocks 322 and 324 in FIG. 3), Host-B 111 receives the broadcasted request message and responds to Host-A 110 with a response message. The response message indicates its availability to take over and includes a host utilization value representing the current load at Host-B 111. For example, the host utilization value may be between zero (lowest resource utilization or highest capacity) and ten (highest resource utilization or lowest capacity). In the example in FIG. 1, the request message may be broadcasted to Host-B 111 and at least one other host (e.g., Host-C, etc.). Multiple response messages may be received by Host-A 110.

At blocks 530 and 540 in FIG. 5 (related to block 330 in FIG. 3), Host-A 110 receives the response message sent by each host and selects a host with availability to take control of storage controller 126. If multiple response messages are received, the host with the lowest resource utilization may be selected. For example in FIG. 1, if Host-B 111 responds with a host utilization value=2, and Host-C (not shown for simplicity) with host utilization value=6, HIDS control module 116 selects Host-B 111 to take over.

At blocks 542 to 580 in FIG. 5 (related to block 340 in FIG. 3), Host-A 110 transfers control of storage controller 126 to Host-B 111. In particular, at block 542, HIDS control module 117 of Host-B 111 establishes a communication path with storage controller 126 via network controller 100, such as Input/Output (I/O) path, etc.

At blocks 550 and 560 in FIG. 5, HIDS control module 116 of Host-A 110 interrupts storage controller 126 to pause the processing of all pending control instructions for storage controller 126, and transfer the pending control instructions to HIDS control module 117 of Host-B 111. During the transfer, the unique storage controller ID and network controller ID of Host-A 110 may be sent to HIDS control module 117 of Host-B 111 for subsequent communication.

At block 562, once the control is transferred, HIDS control module 117 of Host-B 111 resumes processing of the pending control instructions for storage controller 126. At block 564, HIDS control module 117 of Host-B 111 sends a notification to HIDS control module 116 of Host-A 110 to indicate that Host-B 111 has active control of storage controller 126. This completes the transfer of control.

In one example, prior to transferring the control of storage controller 126 to Host-B 111 at block 550, HIDS control module 116 may quiesce storage controller 126. The term "queiscing" may refer generally to temporarily disabling, suspending or deactivating operations of storage controller 126. In practice, quiescing storage controller 126 may also involve backing up relevant data, etc. In this case, once the control is transferred, HIDS control module 117 may unquiesce storage controller 126 such that the processing of pending control instructions may resume at block 562.

At block 570 and 580 in FIG. 5 (related to block 350 in FIG. 3), HIDS control module 116 enters Host-A 110 into the partial suspend mode in which storage controller 126 remains controllable by HIDS control module 117 of Host-B 111 via network controller 130. In practice, once the transfer is completed, a ready-to-suspend message may be sent from HIDS control module 116 to hypervisor 114, which then reduces or cuts off the power supply from first power source 250 to processor 122, memory 124 and chipset 240.

(b) Resumption from Partial Suspend Mode

Figure 6:
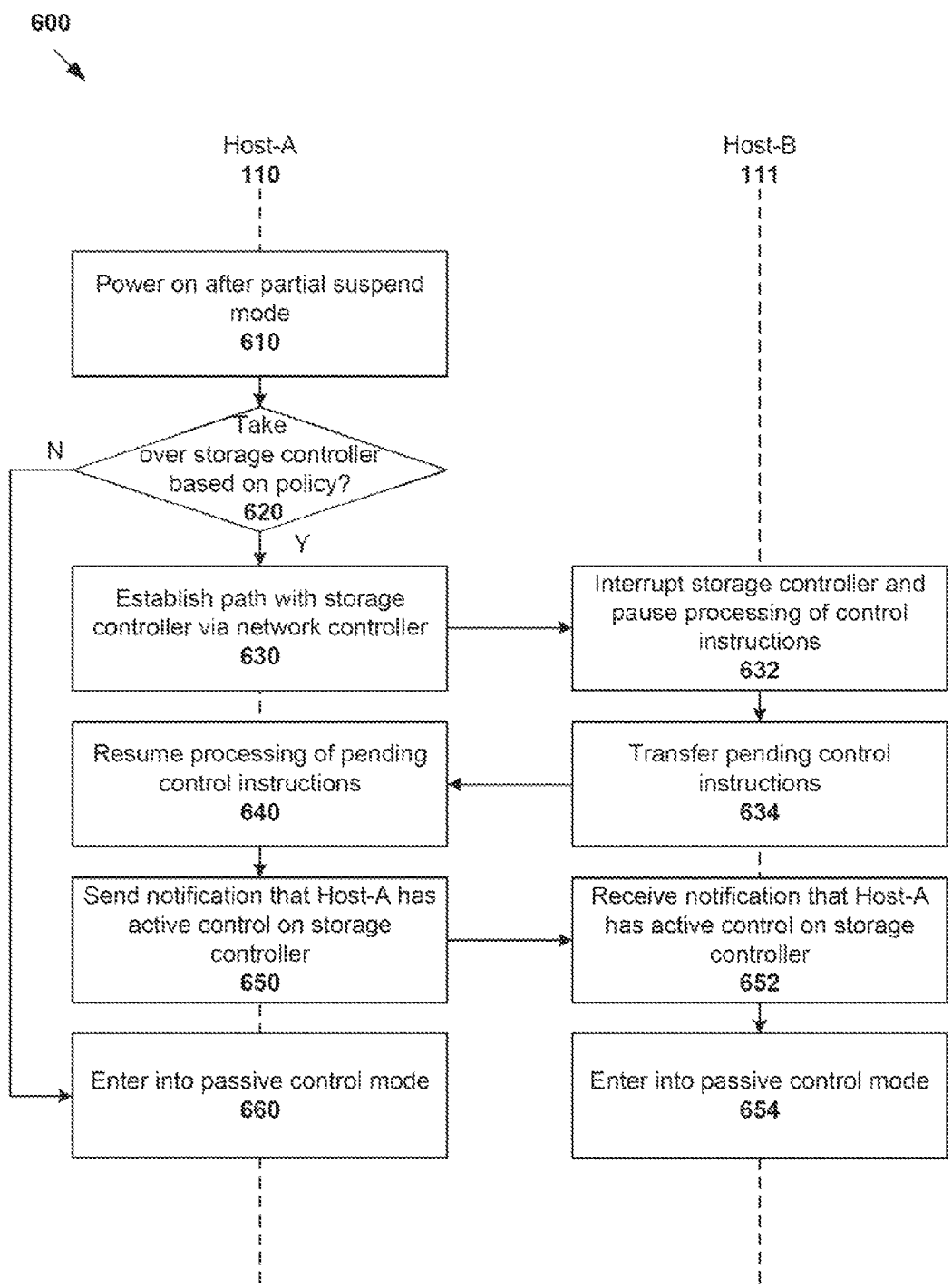
FIG. 6 is a flowchart of a detailed example process to perform power management when a host resumes from a partial suspend mode according to the distributed approach in FIG. 3.

FIG. 6 is a flowchart of detailed example process 600 to perform power management when a host (e.g., Host-A 110) resumes from a partial suspend mode according to the distributed approach in FIG. 3. Here, the term "resume" may refer generally to restoring full power to one or more components of a host (e.g., Host-A 110) that are powered off or have reduced power supply during the partial suspend mode. Example process 600 may include one or more operations, functions, or actions illustrated by one or more blocks, such as blocks 610 to 660. The various blocks may be combined into fewer blocks, divided into additional blocks, and/or eliminated based upon the desired implementation.

At blocks 610 and 620 in FIG. 6, after powering on to resume from the partial suspend mode, Host-A 110 determines whether to take control of storage controller 126 from Host-B 111. In particular, at block 610, HIDS control module 116 may contact or synchronize with other hosts in cluster 105 to learn that storage controller 126 is controlled by Host-B 111 (e.g., based on local configuration data or data received from another host). In practice, Host-A 110 may be powered on when the resource utilization at Host-B 111 approaches maximum, for example to a point where it cannot satisfy a power-on request from virtual machine 113. An administrator may also want to power on Host-A 110 to forcefully load balance across Host-A 110 and Host-B 111 when high resource utilization is forecasted.

The determination at block 620 may depend on any suitable policy for cluster 105, For example, HIDS control module 116 of Host-A 110 may decide to regain control of storage controller 126 (see block 630) to reduce the load at Host-B 111. In another example, HIDS control module 116 may even offer to take control of other storage controller managed by Host-B 111 to better balance the load between them. Otherwise, HIDS control module 116 may leave the control of storage controller 126 with Host-B 111 (see block 660), such as when resource utilization is low at Host-B 111.

At block 630 in FIG. 6, after deciding to take over control of storage controller 126, HIDS control module 116 of Host-A 110 initiates a transfer of control by establishing a communication path (e.g., path) with storage controller 126 via network controller 130. At block 632 in FIG. 6, HIDS control module 117 of Host-B 111 may interrupt storage controller 126 to pause processing of pending control instructions for storage controller 126. Then, at block 634, HIDS control module 117 of Host-B 111 may transfer the pending control instructions to HIDS control module 116 of Host-A 110.

At block 640 in FIG. 6, HIDS control module 116 of Host-A 110 resumes processing of pending control instructions transferred from HIDS control module 117 of Host-B 111. In this case, Host-A 110 returns to active control mode and full line 150 in FIG. 1 again represents an active control line between HIDS control module 116 of Host-A 110 and storage controller 126.

Similar to the example in FIG. 6, HIDS control module 117 may quiesce storage controller 126 to temporarily disable, suspend or deactivate operations of storage controller 126 before transferring the control at block 634. In this case, once the control is transferred, HIDS control module 116 may unquiesce storage controller 126 in order to resume the processing of pending control instructions at block 640.

At block 650 in FIG. 6, HIDS control module 116 sends a notification to inform Host-B 111 that Host-A 110 has active control of storage controller 126. At blocks 652 and 654 in FIG. 6, HIDS control module 117 of Host-B 111 receives the notification and enters into a passive control mode. Referring to dotted line 152 in FIG. 1 again, this means that Host-B 111 is not currently controlling storage controller 126 but may take active control, for example if Host-A 110 enters into a partial suspend mode again.

As discussed in relation to block 620 in FIG. 6, HIDS control module 116 of Host-A 110 may decide leave the control of its local storage controller 126 with Host-B 111. In this case, at block 660 in FIG. 6, Host-A 110 may enter into a passive control mode, where Host-A 110 is not currently controlling storage controller 126 but may be ready to take active control.

Centralized Approach—Detailed Implementation

Compared to the distributed approach, the centralized approach may be used to leverage the capability of management entity 160 and reduce the processing burden at Host-A 110 and Host-B 111. Detailed implementation of the example centralized approach in FIG. 4 will be discussed using FIG. 7, FIG. 8 and FIG. 9. In particular, an example virtual appliance will be explained using FIG. 7, entry of a host (e.g., Host-A 110) into a partial suspend mode using FIG. 8, and its resumption from partial suspend mode using FIG. 9.

(a) Virtual Appliance

As explained using FIG. 1 and FIG. 4, management entity 160 supports HIDS management module 162 to manage the transfer of control of storage controller 126 between Host-A 110 and Host-B 111. In one example, HIDS management module 162 may run inside a virtual machine as a virtual appliance. Throughout the present disclosure, the term "virtual appliance" may generally refer to a pre-built software solution that includes one or more virtual machines that may be packaged, updated, maintained and managed as a unit.

Figure 7:
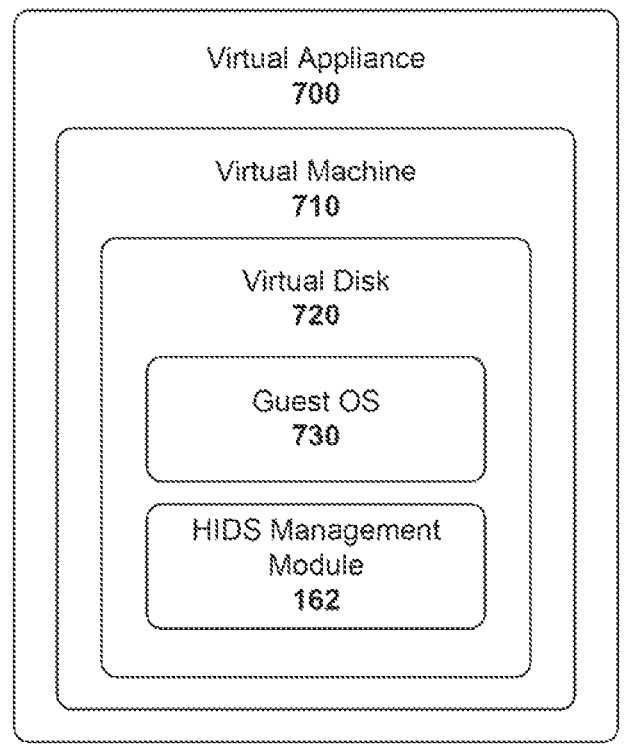
FIG. 7 is a schematic diagram illustrating an example virtual appliance to perform power management according to the example centralized approach in FIG. 4.

In more detail, FIG. 7 is a schematic diagram illustrating example virtual appliance 700 to perform power management according to the example centralized approach in FIG. 4. Although an example is shown, it should be understood that virtual appliance 700 may include additional or alternative components, and each component may have a different configuration.

Virtual appliance 700 packages virtual machine 710 (one shown for simplicity) for deployment or installation. Any suitable packaging format may be used, such as Open Virtualization Format (OVF), etc. Virtual machine 710 is to support guest operating system 730 and an application in the form of HIDS management module 162. Virtual disk 720 may be used by virtual machine 710 to store data relating to guest operating system 730 and HIDS management module 162. The term "virtual disk" may refer generally to file or files on a file system that appear as a single hard disk to guest operating system 730.

The utilization of virtual appliances represents a new way of deploying software applications such as HIDS management module 162 on management entity 160. For developers and users, the benefits of virtual appliances include a reduction in development and distribution costs, accelerated time to market and the ability to leverage capabilities of different virtualization platforms. Although HIDS management module 162 is implemented by management entity 160, it may be deployed on any other suitable entity (virtual or physical) in virtualized computing environment 100.

Although virtual appliance 700 is shown as an example in FIG. 7, it will be appreciated that HIDS management module 162 may be packaged and deployed using any other software container technology. As an example, Docker's container-based platform facilitates the development, shipping and running of applications as Docker containers. A Docker container is lightweight in nature, portable and securely isolates an application. This allows many containers may be run simultaneously on a physical or virtual machine in virtualized computing environment 100.

(b) Entry Into Partial Suspend Mode

Figure 8:
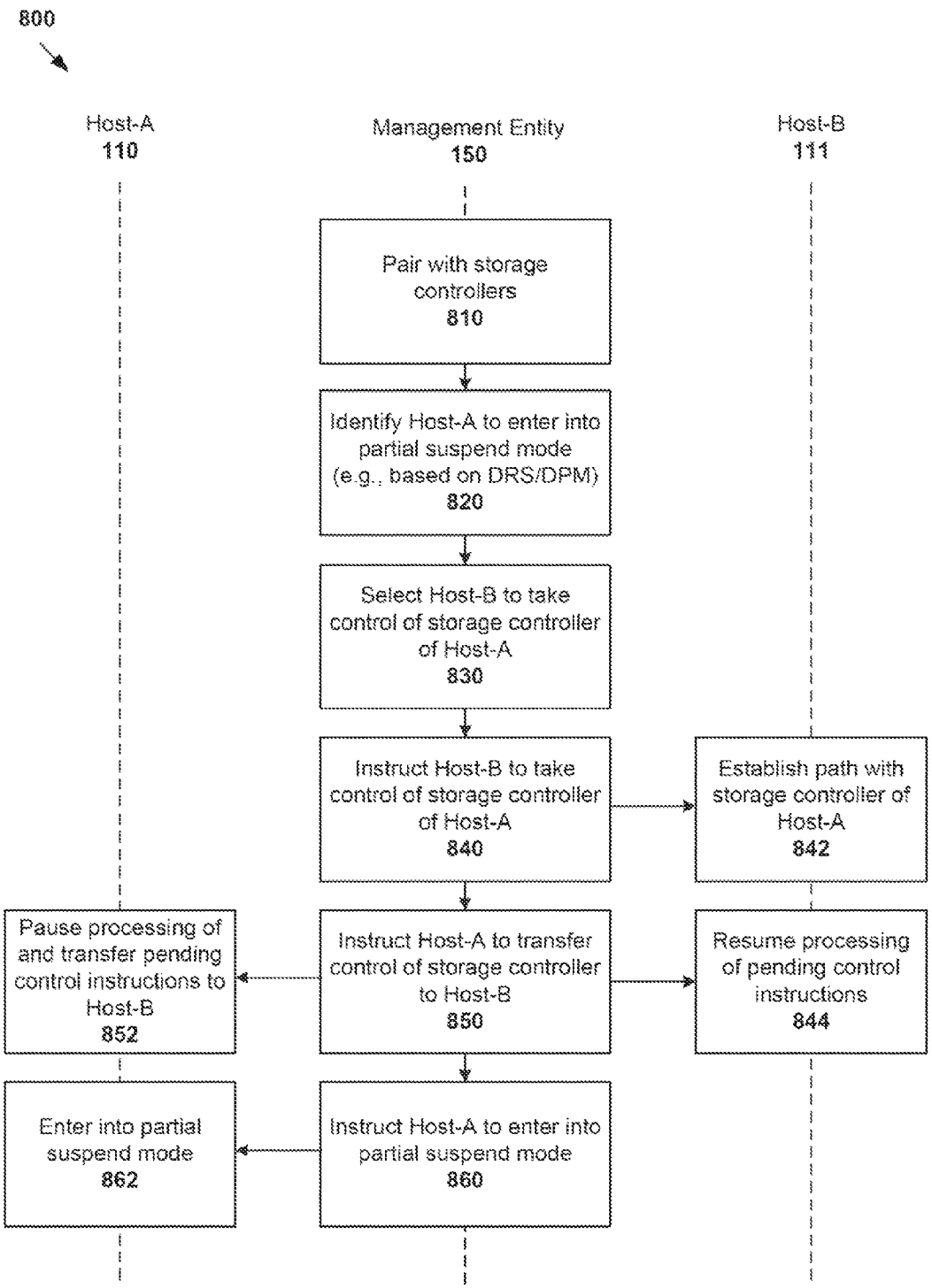
FIG. 8 is a flowchart of a detailed example process to perform power management when a host enters into a partial suspend mode according to the centralized approach in FIG. 4.

FIG. 8 is a flowchart of detailed example process 800 to perform power management when a host (e.g. Host-A 110) enters into a partial suspend mode according to the centralized approach in FIG. 4. Example process 800 may include one or more operations, functions, or actions illustrated by one or more blocks, such as blocks 810 to 862. The various blocks may be combined into fewer blocks, divided into additional blocks, and/or eliminated based upon the desired implementation.

At block 810 in FIG. 8, HIDS management module 162 of management entity 160 may perform a configuration process to pair with different storage controllers 126/127. Pairing represents the initial process of establishing a control path and exchange of any configuration data. For example, the pairing process may involve HIDS control module 116/117 sending necessary configuration data to HIDS management module 162, such as when Host-A 110/Host-B 111 is created or added to cluster 105. In the example in FIG. 1, HIDS management module 162 may pair with storage controller 126 of Host-A 110 via network controller 130 using their respective unique IDs (e.g., "Storage Controller A" and "Network Controller A"). Similarly, HIDS management module 162 may pair with storage controller 127 of Host-B 111 via network controller 131 using their respective unique IDs (e.g., "Storage Controller B" and "Network Controller B").

The pairing is to facilitate subsequent communication between management entity 160 and storage controller 126/127 as well as between Host-A 110 and Host-B via management entity 160. HIDS management module 162 may then handle any control instructions for storage controller 126 (either locally from Host-A 110 or remotely from Host-B 111) and storage controller 127 (either locally from Host-B 111 or remotely from Host-A 110).

At block 820 in FIG. 8 (related to block 410 in FIG. 4), HIDS management module 162 of management entity 160 identifies Host-A 110 from cluster 105 to enter into a partial suspend mode. Block 820 may be performed based on data relating to the resource utilization or maintenance requirement of Host-A 110. Similar to block 510 in FIG. 5, the data may be obtained (e.g., received or retrieved) from a DRS module or DPM module in virtualized computing environment 100.

At block 830 in FIG. 8 (related to block 420 in FIG. 4), HIDS management module 162 of management entity 160 selects Host-B 111 from cluster 105 to take control of storage controller 126. Similarly, Host-B 111 may be selected based on data relating to the resource utilization of Host-B 111. For example, if Host-B 111 and Host-C (not shown for simplicity) are both available, Host-B 111 may be selected if it has more capacity or resources. Similarly, the data may be obtained (e.g., received or retrieved) from the DRS module or DPM module.

At blocks 840 and 850 in FIG. 8 (related to block 430 in FIG. 4), HIDS management module 162 of management entity 160 transfers control of storage controller 126 from Host-A 110 to Host-B 111. In particular, at block 840, HIDS management module 162 instructs Host-B 111 to take over control of storage controller 126. Then at block 850, HIDS management module 162 interrupts storage controller 126 of Host-A 110 to pause processing of pending control instructions for storage controller 126 and transfer the instructions to Host-B 111. At blocks 842 and 852, Host-B 111 and Host-A 110 proceed as instructed.

In one example, prior to the transfer of control at blocks 840 and 850, HIDS management module 162 may instruct Host-A 110 to quiesce storage controller 126. When quiesced, operations of storage controller 126 are temporarily disabled, suspended or deactivated. In this case, HIDS control module 117 may unquiesce storage controller 126 before resuming the processing of pending control instructions at block 844. HIDS management module 162 may also instruct storage controller directly to quiesce or unquiesce via network controller 130.

At block 860 in FIG. 8 (related to block 440 in FIG. 4), HIDS management module 162 of management entity 160 instructs Host-A 110 to enter into a partial suspend mode. At block 862, Host-A 110 enters into the partial suspend mode, In this case, hypervisor 114 of Host-A 110 suspends operations of one or more components to reduce or cut off their power supply from first power source 250. However, power from second power source 260 is supplied to storage controller 126 and network controller 130. The pairing between storage controller 126 and HIDS management module 162 is also maintained to facilitate communication. This allows HIDS control module 117 of Host-B 111 to communicate with storage controller 126 via network controller 131 of Host-B 111, HIDS management module 162 and network controller 130 of Host-A 110.

(b) Resumption from Partial Suspend Mode

Figure 9:
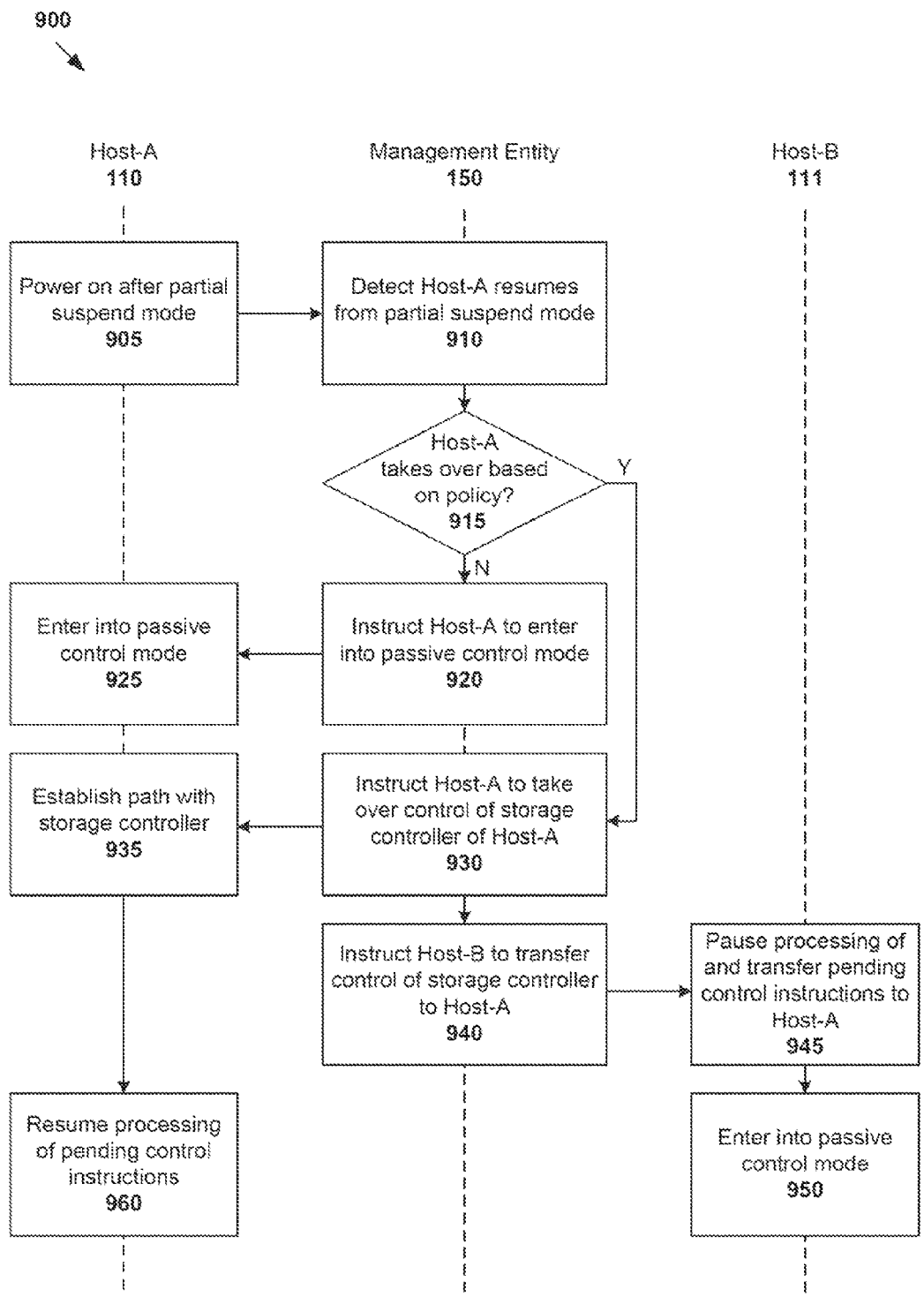
FIG. 9 is a flowchart of a detailed example process to perform power management when a host resumes from a partial suspend mode according to the centralized approach in FIG. 4.

FIG. 9 is a flowchart of detailed example process 900 to perform power management when a host (e.g., Host-A 110) resumes from a partial suspend mode according to the centralized approach in FIG. 4. Example process 900 may include one or more operations, functions, or actions illustrated by one or more blocks, such as blocks 905 to 960. The various blocks may be combined into fewer blocks, divided into additional blocks, and/or eliminated based upon the desired implementation.

At block 905 in FIG. 9, Host-A 110 powers on to resume from the partial suspend mode. For example, processor 122, memory 124, and chipset 240 of Host-A 110 are powered on after having their power supply reduced or cut off during the partial suspend mode. At this stage, HIDS control module 116 of Host-A 110 may synchronize with other hosts such as Host-B 111 to learn about the current state of cluster 105.

At blocks 910 and 915 in FIG. 9, HIDS management module 162 of management entity 160 detects that Host-A 110 resumes from the partial suspend mode and proceeds to determine whether Host-A 110 should to take over control its of storage controller 126. Block 915 may be based on any suitable policy, such as to improve resource utilization within cluster 105.

At blocks 920 and 925 in FIG. 9 (no takeover), HIDS management module 162 of management entity 160 instructs HIDS control module 116 of Host-A 110 to enter into a passive control mode. As explained using FIG. 1, this means storage controller 126 is remotely controlled by Host-B 111 although Host-A 110 is not in partial suspend mode. In this case, full line 150 in FIG. 1 represents a passive control line between HIDS control module 116 and storage controller 126.

Otherwise, at blocks 930 and 940 in FIG. 9 (takeover to be made), HIDS management module 162 of management entity 160 initiates a transfer of control from Host-B 111 to Host-A 110. In particular, at block 930, HIDS management module 162 of management entity 160 instructs HIDS control module 116 of Host-A 110 to take over control of its storage controller 126, At block 935, HIDS control module 116 proceeds to do so by establishing a communication path with storage controller 126 via network controller 130.

At block 940 in FIG. 9, HIDS management module 162 of management entity 160 instructs HIDS control module 117 of Host-B 111 to transfer the control of storage controller to RIDS control module 116 of Host-A 110. At blocks 945 and 950 in FIG. 9, HIDS control module 117 proceeds to pause processing of pending control instructions for storage controller 126 and transfer the instructions to HIDS control module 116 before entering into a passive control mode. As explained using FIG. 1, this means Host-B 111 is no longer controlling storage controller 126 remotely. In this case, dotted line 152 in FIG. 1 represents a passive control line between HIDS control module 117 of Host-B 111 and storage controller 126.

Similar to the example in FIG. 8, prior to the transfer of control at blocks 940 and 945, HIDS management module 162 may instruct Host-B 111 to quiesce storage controller 126 to temporarily disable, suspend or deactivate operations of storage controller 126. In this case, HIDS management module 162 may also instruct Host-A 110 to unquiesce storage controller 126 before resuming the processing at block 960. HIDS management module 162 may also instruct storage controller 126 directly to quiesce or unquiesce via network controller 130.

At block 960 in FIG. 9, once the pending control instructions are transferred, Host-A 110 proceeds to resume their processing using storage controller 126. In this case, Host-A 110 returns to active control mode and full line 150 in FIG. 1 again represents an active control line between HIDS control module 116 and storage controller 126. HIDS control module 116 may communicate with storage controller 126 via network controller 130 and HIDS management module 162.

Operational Made Transition

Figure 10:
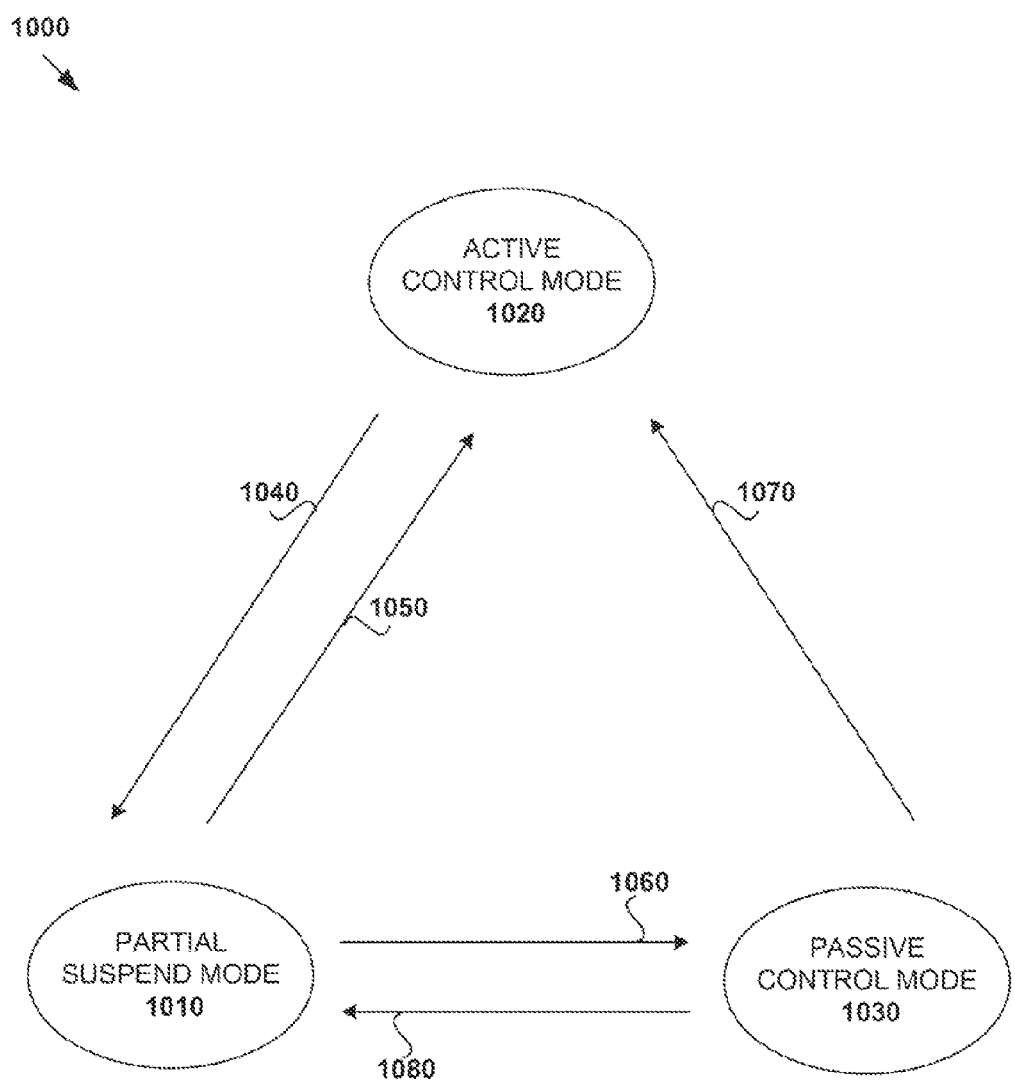
FIG. 10 is a schematic diagram illustrating example operational modes of a host and transitions between the operational modes.

FIG. 10 is a schematic diagram 1000 illustrating example operational modes of a host (e.g., Host-A 110) and transitions between the operational modes. As explained using examples of the distributed approach and centralized approach, Host-A 110 may enter into a partial suspend mode (see 1010), active control mode (see 1020) or passive control mode (see 1030). Although modes 1010 to 1030 are shown in FIG. 10, the host may operate in additional or alternative operational modes and additional or alternative transitions may occur in practice.

At 1040 in FIG. 10, Host-A 110 may transition from active control mode 1020 to partial suspend mode 1010 by transferring control of storage controller 126 to Host-B 111 and suspending operations of hardware components such as processor 122, memory 124, chipset 240, etc., to reduce power consumption. See examples in FIG. 3, FIG. 4, FIG. 5 and FIG. 8.

At 1050 in FIG. 10, Host-A 110 may transition from partial suspend mode 1010 to active control mode 1020 by regaining the control of storage controller 126 from Host-B 111. After resuming from partial suspend mode 1010, hardware components such as processor 122, memory 124, chipset 240, etc., are also powered on. See examples in FIG. 6 and FIG. 9.

Otherwise, at 1060 in FIG. 10, Host-A 110 may transition from partial suspend mode 1010 to passive control mode 1030 by not taking over the control of storage controller 126 from Host-B 111. This means Host-B 111 continues to control storage controller 126 remotely although Host-A 110 is no longer in partial suspend mode 1010. See examples in FIG. 6 and FIG. 9.

From passive control mode 1030, Host-A 110 may transition to active control mode 1020 at block 1070 in FIG. 10 by taking over the control of storage controller 126 from Host-B 111, such as due to load balancing, etc. Otherwise, at block 1080, Host-A 110 may transition to partial suspend mode 1010 to further reduce power consumption. In this case, Host-A 110 is not controlling storage controller 126 and does not have to transfer any control to Host-B 111.

Although the examples above use Host-A 110 as a candidate for partial suspension, it should be understood that Host-B 111 may also be entered into the partial suspend mode. In this case, control of storage resource 127 of Host-B 111 may be transferred to Host-A 110 to allow Host-A 110 to access storage resources 129 via network controller 131. Further, although two hosts are shown in FIG. 1, there may be additional hosts (e.g., Host-C, Host-D, etc.) that may be entered into a partial suspend mode and control of their storage controllers taken over by others.

Computing System

Figure 11:
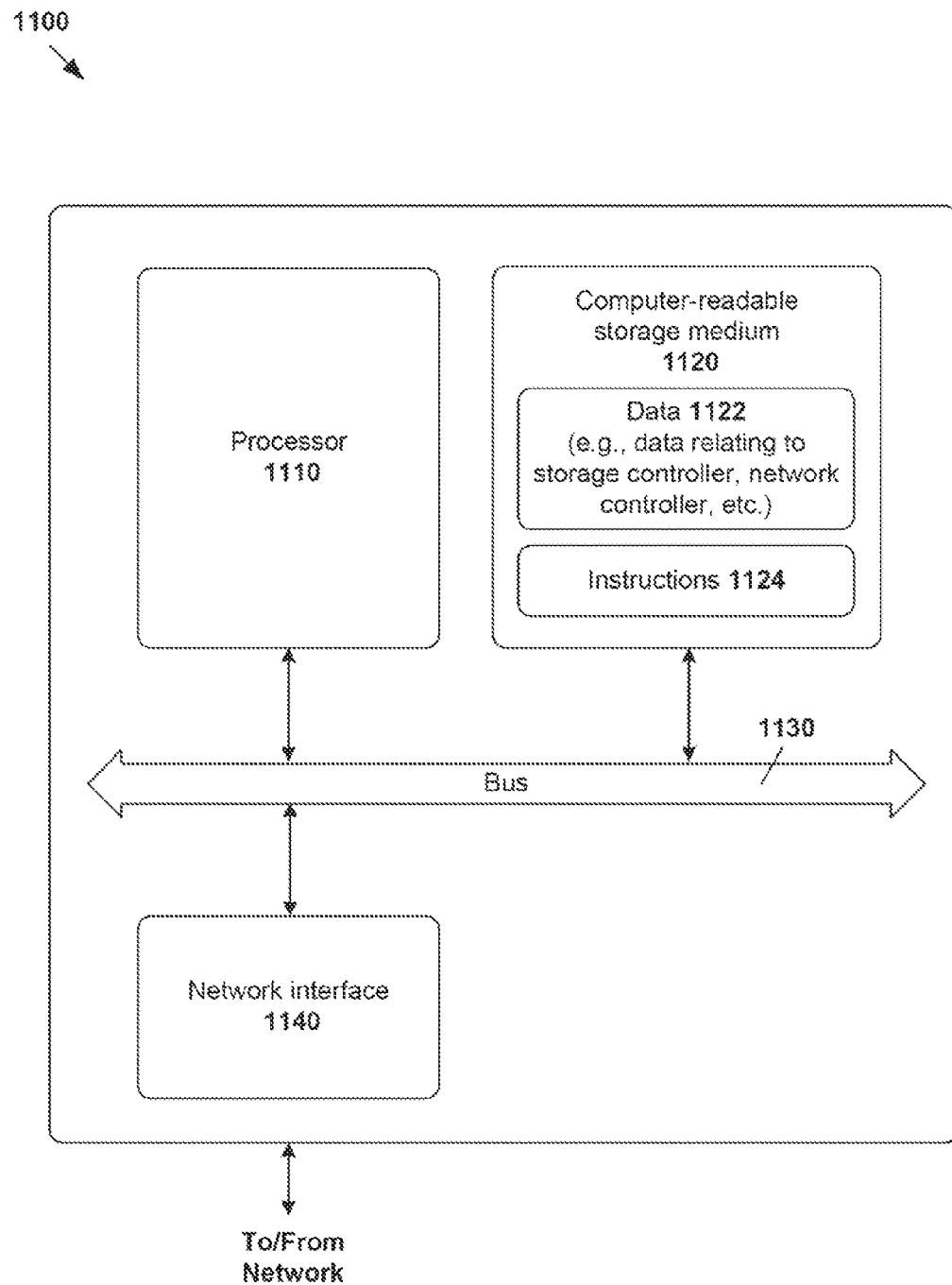
FIG. 11 is a schematic diagram illustrating an example computing system acting as a management entity.

The above examples can be implemented by hardware, software or firmware or a combination thereof. FIG. 11 is a schematic diagram illustrating an example computing system 1100 acting as management entity 160. Example computing system 1100 for power management of distributed storage system 140 may include processor 1110, computer-readable storage medium 1120, network interface 1140, and bus 1130 that facilitates communication among these illustrated components and other components.

Processor 1110 is to perform processes described herein with reference to the drawings. Computer-readable storage medium 1120 may store any suitable data 1122, such as data relating to storage controller 126/127, network controller 130/131, etc. Computer-readable storage medium 1120 may further store computer-readable instructions 1124 which, in response to execution by processor 1110, cause processor 1110 to perform processes described herein with reference to the drawings.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to perform centralized power management for a distributed storage system accessible by a cluster in a virtualized computing environment, wherein storage resources of the cluster are aggregated in the distributed storage system, the method comprising:
    identifying, by a management entity in the virtualized computing environment, a first host from the cluster to enter into a partial suspend mode, wherein the first host includes a storage controller and a first storage resource and is configured to support one or more virtual machines;
    selecting, by the management entity, a second host from the cluster to take control of the storage controller of the first host, wherein the second host includes a second storage resource and is configured to support one or more virtual machines;
    transferring, by the management entity, control of the storage controller to the second host to allow the second host to control the storage controller via a network controller of the first host; and
    instructing, by the management entity, the first host to enter into the partial suspend mode to suspend operations of one or more components of the first host while the storage controller is controllable by the second host via the network controller.

2. The method of claim 1, wherein transferring control of the storage controller comprises:
    instructing, by the management entity, the first host to pause processing of pending control instructions for the storage controller and to transfer the pending control instructions to the second host.

3. The method of claim 2, wherein transferring control of the storage controller comprises:
    instructing, by the management entity, the second host to establish a communication path with the storage controller via the network controller of the first host and to resume processing of the pending control instructions.

4. The method of claim 3, wherein transferring control of the storage controller comprises:
    instructing, by the management entity, the first host to quiesce the storage controller prior to transferring the pending control instructions to the second host; and
    instructing, by the management entity, the second host to unquiesce the storage controller prior to resuming processing of the pending control instructions.

5. The method of claim 1, the method further comprising:
    pairing, by the management entity, with the storage controller of the first host to facilitate communication between the second host and the storage controller of the first host.

6. The method of claim 1, further comprising in response to detecting that the first host resumes from the partial suspend mode, determining, by the management entity, whether to transfer control of the storage controller from the second host to the first host.

7. The method of claim 6, further comprising in response to determination to transfer control of the storage controller,
    instructing, by the management entity, the second host to pause processing of pending control instructions for the storage controller and transfer the pending control instructions to the first host; and
    instructing, by the management entity, the first host to establish a communication path between the first host and the storage controller to resume processing of the pending control instructions.

8. The method of claim 7, further comprising:
    instructing, by the management entity, the second host to quiesce the storage controller prior to transferring the pending control instructions to the first host; and
    instructing, by the management entity, the first host to unquiesce the storage controller prior to resuming processing of the pending control instructions.

9. The method of claim 6, further comprising in response to determination to not transfer control of the storage controller,
    instructing, by the management entity, the first host to enter into a passive control mode in which the storage controller remains controllable by the second host although the first host is not in the partial suspend mode.

10. The method of claim 1, wherein:
    identifying the first host comprises obtaining first data relating to resource utilization or maintenance requirement of the first host and based on the first data, identifying the first host to enter into the partial suspend mode; and
    selecting the second host comprises obtaining second data relating to resource utilization or maintenance requirement of the second host and selecting the second host based on the second data.

11. A non-transitory computer-readable storage medium that includes a set of instructions which, in response to execution by a processor of a management entity, causes the processor to perform a method of centralized power management of a distributed storage system accessible by a cluster in a virtualized computing environment, wherein storage resources of the cluster are aggregated in the distributed storage system, the method comprising:

identifying, by the management entity in the virtualized computing environment, a first host from the cluster to enter into a partial suspend mode, wherein the first host includes a storage controller and a first storage resource and is configured to support one or more virtual machines;

selecting, by the management entity, a second host from the cluster to take control of the storage controller of the first host, wherein the second host includes a second storage resource and is configured to support one or more virtual machines;

transferring, by the management entity, control of the storage controller to the second host to allow the second host to control the storage controller via a network controller of the first host; and instructing, by the management entity, the first host to enter into the partial suspend mode to suspend operations of one or more components of the first host while the storage controller is controllable by the second host via the network controller.

12. The non-transitory computer-readable storage medium of claim 11, wherein transferring control of the storage controller comprises:

instructing, by the management entity, the first host to pause processing of pending control instructions for the storage controller and to transfer the pending control instructions to the second host.

13. The non-transitory computer-readable storage medium of claim 12, wherein transferring control of the storage controller comprises:

instructing, by the management entity, the second host to establish a communication path with the storage controller via the network controller of the first host and to resume processing of the pending control instructions.

14. The non-transitory computer-readable storage medium of claim 13, wherein transferring control of the storage controller comprises:

instructing, by the management entity, the first host to quiesce the storage controller prior to transferring the pending control instructions to the second host; and instructing, by the management entity, the second host to unquiesce the storage controller prior to resuming processing of the pending control instructions.

15. The non-transitory computer-readable storage medium of claim 11, the method further comprising:

pairing, by the management entity, with the storage controller of the first host to facilitate communication between the second host and the storage controller of the first host.

16. The non-transitory computer-readable storage medium of claim 11, the method further comprising in response to detecting that the first host resumes from the partial suspend mode, determining, by the management entity, whether to transfer control of the storage controller from the second host to the first host.

17. The non-transitory computer-readable storage medium of claim 16, the method further comprising in response to determination to transfer control of the storage controller, instructing, by the management entity, the second host to pause processing of pending control instructions for the storage controller and transfer the pending control instructions to the first host; and instructing, by the management entity, the first host to establish a communication path between the first host and the storage controller to resume processing of the pending control instructions.

18. The non-transitory computer-readable storage medium of claim 17, the method further comprising:

instructing, by the management entity, the second host to quiesce the storage controller prior to transferring the pending control instructions to the first host; and instructing, by the management entity, the first host to unquiesce the storage controller prior to resuming processing of the pending control instructions.

19. The non-transitory computer-readable storage medium of claim 16, the method further comprising in response to determination to not transfer control of the storage controller, instructing, by the management entity, the first host to enter into a passive control mode in which the storage controller remains controllable by the second host although the first host is not in the partial suspend mode.

20. The non-transitory computer-readable storage medium of claim 11, wherein:

identifying the first host comprises obtaining first data relating to resource utilization or maintenance requirement of the first host and based on the first data, identifying the first host to enter into the partial suspend mode;

and selecting the second host comprises obtaining second data relating to resource utilization or maintenance requirement of the second host and selecting the second host based on the second data.

21. A computing system to perform centralized power management for a distributed storage system accessible by a cluster in a virtualized computing environment, wherein storage resources of the cluster are aggregated in the distributed storage system, wherein the computing system comprises:

a processor; and a non-transitory computer-readable storage medium storing instructions that, when executed by the processor, cause the processor to:

identify a first host from the cluster to enter into a partial suspend mode, wherein the first host includes a storage controller and a first storage resource and is configured to support one or more virtual machines;

select a second host from the cluster to take control of the storage controller of the first host, wherein the second host includes a second storage resource and is configured to support one or more virtual machines;

transfer control of the storage controller to the second host to allow the second host to control the storage controller via a network controller of the first host; and instruct the first host to enter into the partial suspend mode to suspend operations of one or more components of the first host while the storage controller is controllable by the second host via the network controller.

22. The computer system of claim 21, wherein the instructions cause the processor to transfer control of the storage controller by performing the following:

instruct the first host to pause processing of pending control instructions for the storage controller and to transfer the pending control instructions to the second host.

23. The computer system of claim 22, wherein the instructions cause the processor to transfer control of the storage controller by performing the following:
   instruct the second host to establish a communication path with the storage controller via the network controller of the first host and to resume processing of the pending control instructions.

24. The computer system of claim 23, wherein the instructions further cause the processor to:
   instruct the first host to quiesce the storage controller prior to transferring the pending control instructions to the second host; and
   instruct the second host to unquiesce the storage controller prior to resuming processing of the pending control instructions.

25. The computer system of claim 21, wherein the instructions further cause the processor to:
   pair with the storage controller of the first host to facilitate communication between the second host and the storage controller of the first host.

26. The computer system of claim 21, wherein the instructions further cause the processor to: in response to detecting that the first host resumes from the partial suspend mode, determine whether to transfer control of the storage controller from the second host to the first host.

27. The computer system of claim 26, wherein the instructions further cause the processor to: in response to determination to transfer control of the storage controller, instruct the second host to pause processing of pending control instructions for the storage controller and transfer the pending control instructions to the first host; and
   instruct the first host to establish a communication path between the first host and the storage controller to resume processing of the pending control instructions.

28. The computer system of claim 27, wherein the instructions further cause the processor to:
   instruct the second host to quiesce the storage controller prior to transferring the pending control instructions to the first host; and
   instruct the first host to unquiesce the storage controller prior to resuming processing of the pending control instructions.

29. The computer system of claim 26, wherein the instructions further cause the processor to:
   in response to determination to not transfer control of the storage controller, instruct the first host to enter into a passive control mode in which the storage controller remains controllable by the second host although the first host is not in the partial suspend mode.

30. The computer system of claim 21, wherein the instructions cause the processor to:
   identify the first host by obtaining first data relating to a resource utilization or maintenance requirement of the first host and based on the first data, identifying the first host to enter into the partial suspend mode; and
   select the second host by obtaining second data relating to a resource utilization or maintenance requirement of the second host and selecting the second host based on the second data.

* * * * *